Aug. 29, 1933.   S. W. SPARKS   1,924,522
METHOD OF AND APPARATUS FOR EXTRUDING TUBULAR METAL SHAPES
Original Filed Oct. 4, 1930   15 Sheets-Sheet 1
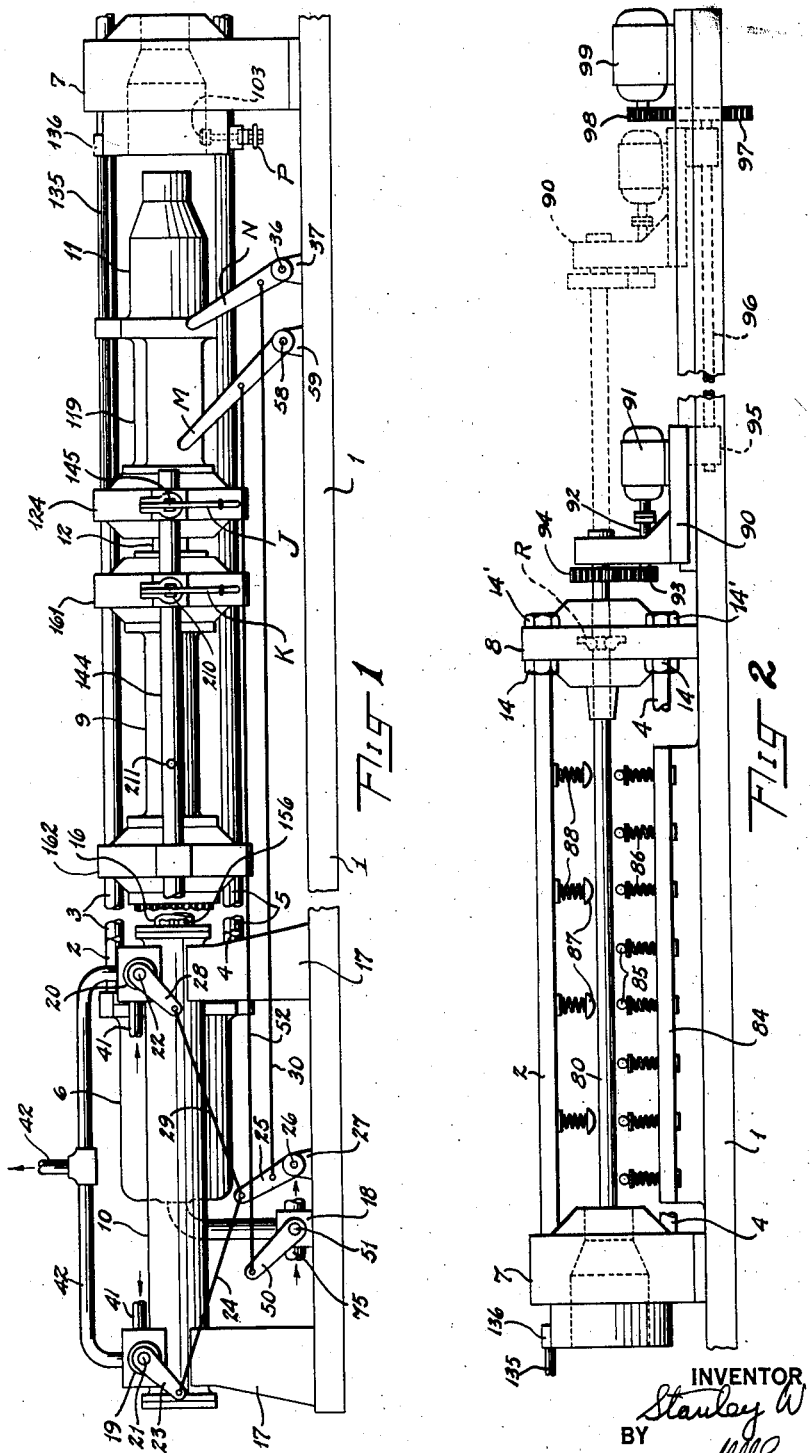
INVENTOR:
Stanley W. Sparks,
BY
His ATTORNEY.

Aug. 29, 1933.         S. W. SPARKS         1,924,522
METHOD OF AND APPARATUS FOR EXTRUDING TUBULAR METAL SHAPES
Original Filed Oct. 4, 1930    15 Sheets-Sheet 2
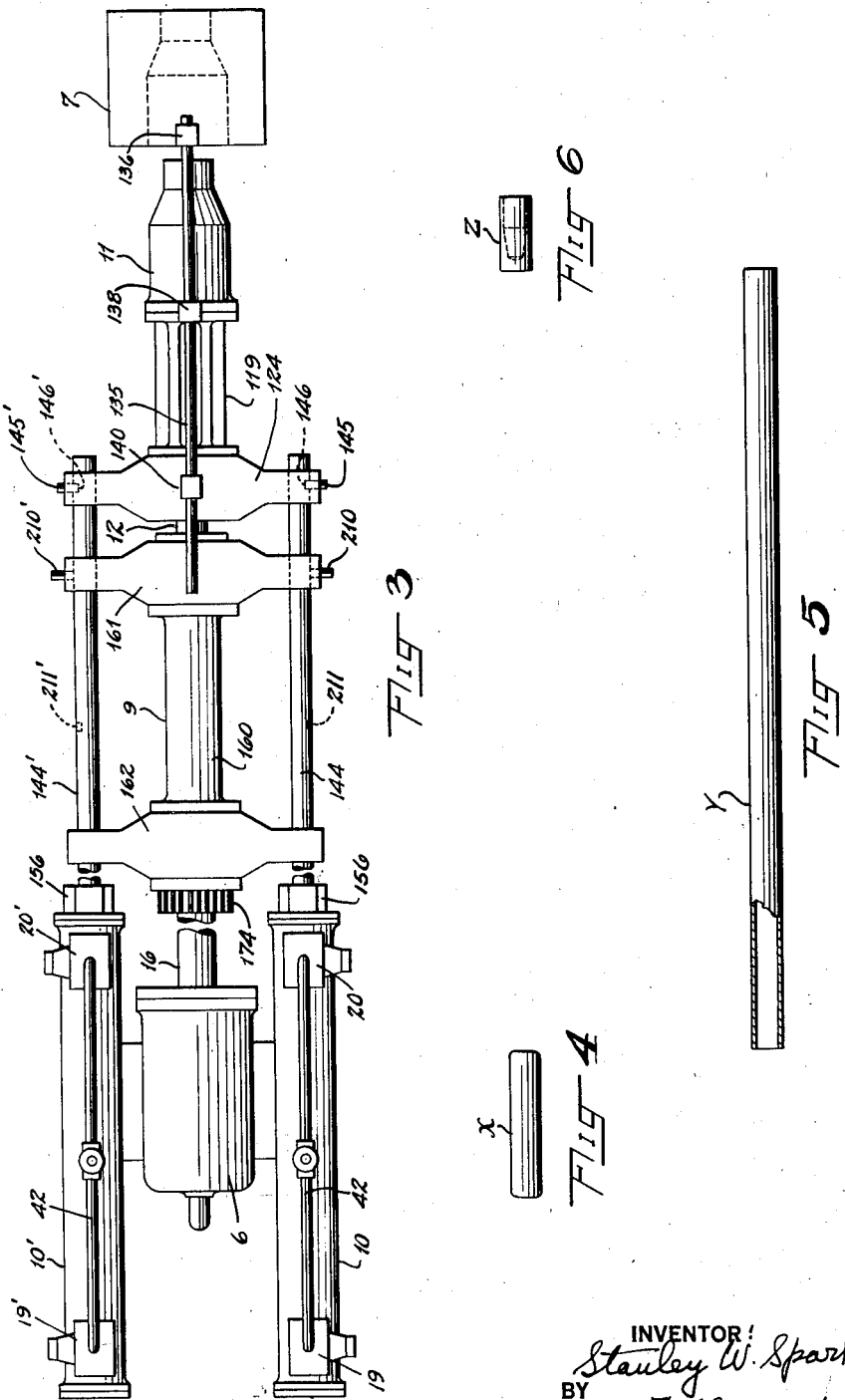

Aug. 29, 1933.     S. W. SPARKS     1,924,522
METHOD OF AND APPARATUS FOR EXTRUDING TUBULAR METAL SHAPES
Original Filed Oct. 4, 1930     15 Sheets-Sheet 3
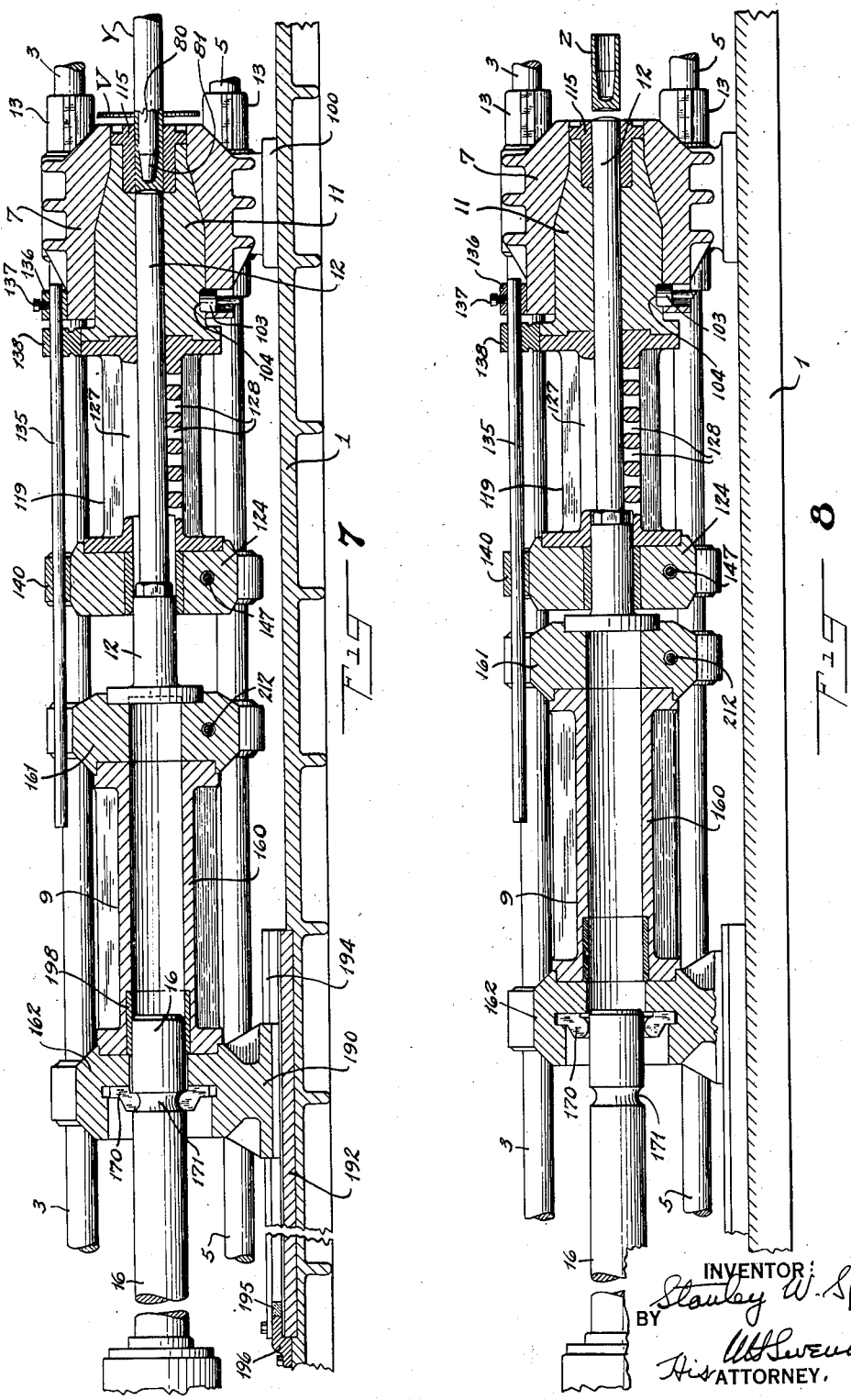
INVENTOR
Stanley W. Sparks,
BY
His ATTORNEY.

Aug. 29, 1933.  S. W. SPARKS  1,924,522
METHOD OF AND APPARATUS FOR EXTRUDING TUBULAR METAL SHAPES
Original Filed Oct. 4, 1930   15 Sheets-Sheet 4
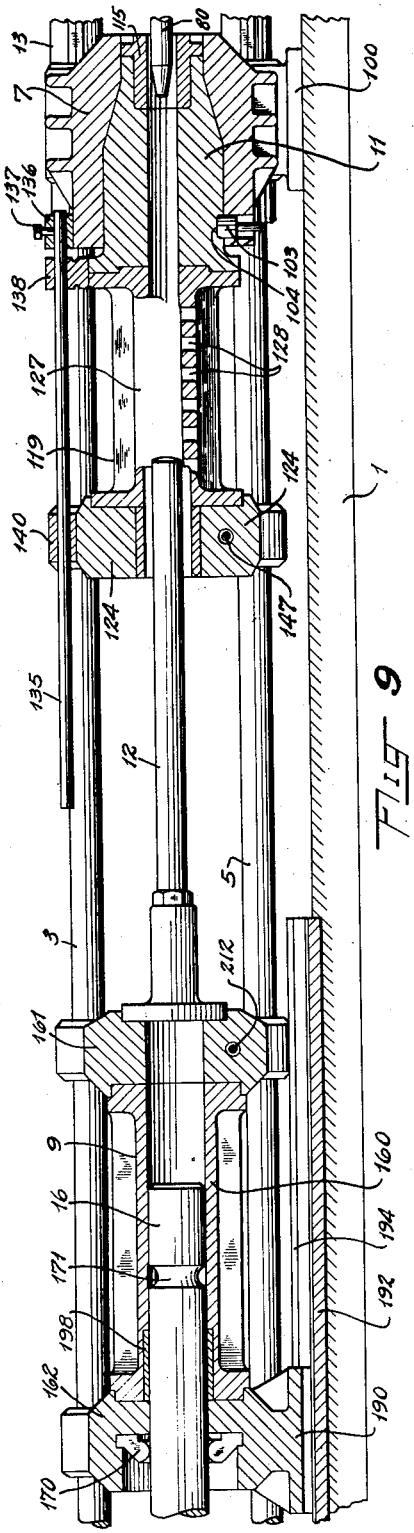
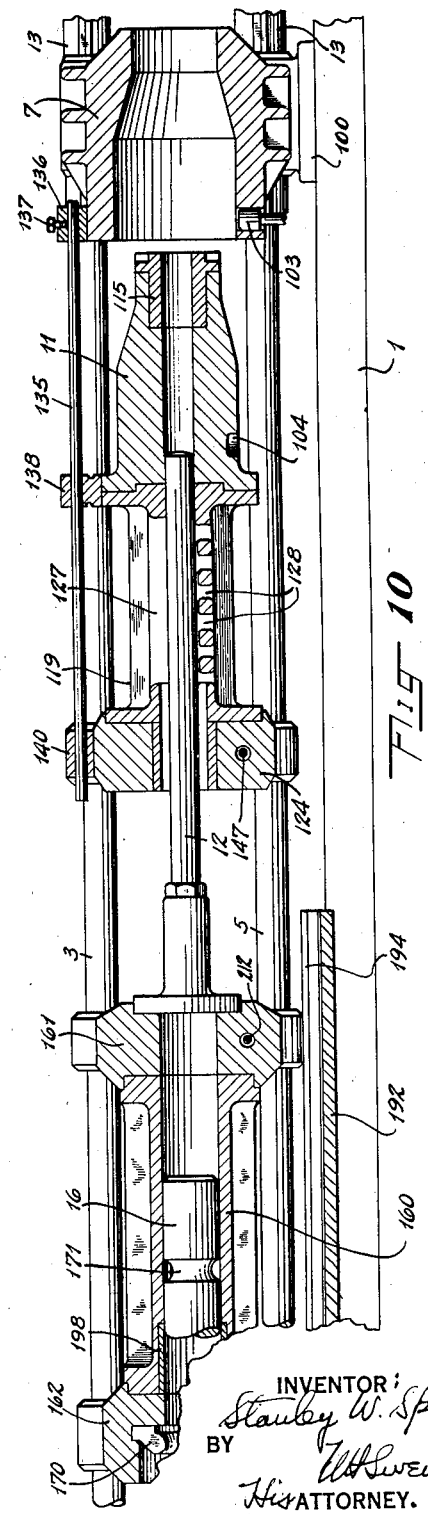
INVENTOR:
Stanley W. Sparks,
BY
His ATTORNEY.

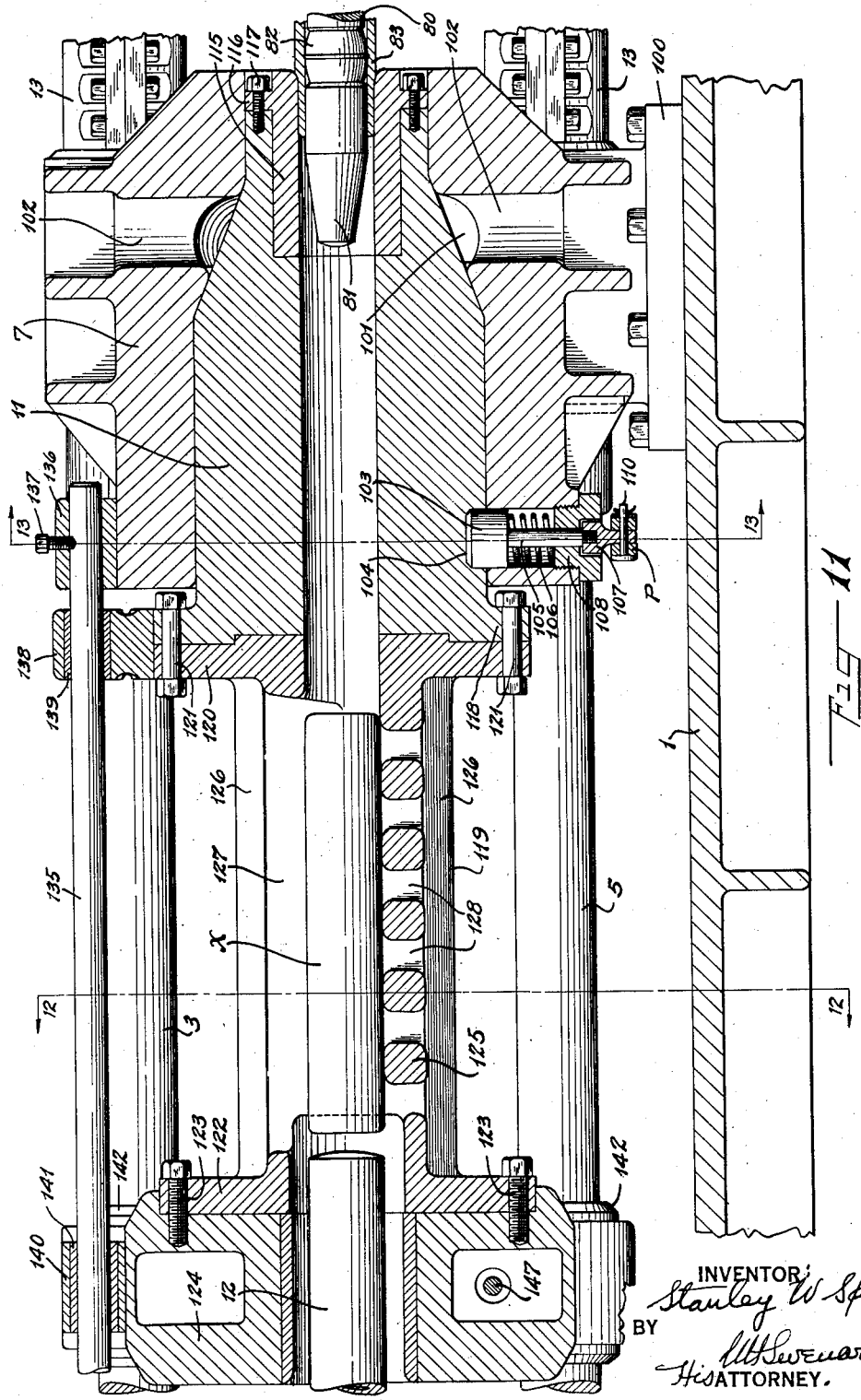

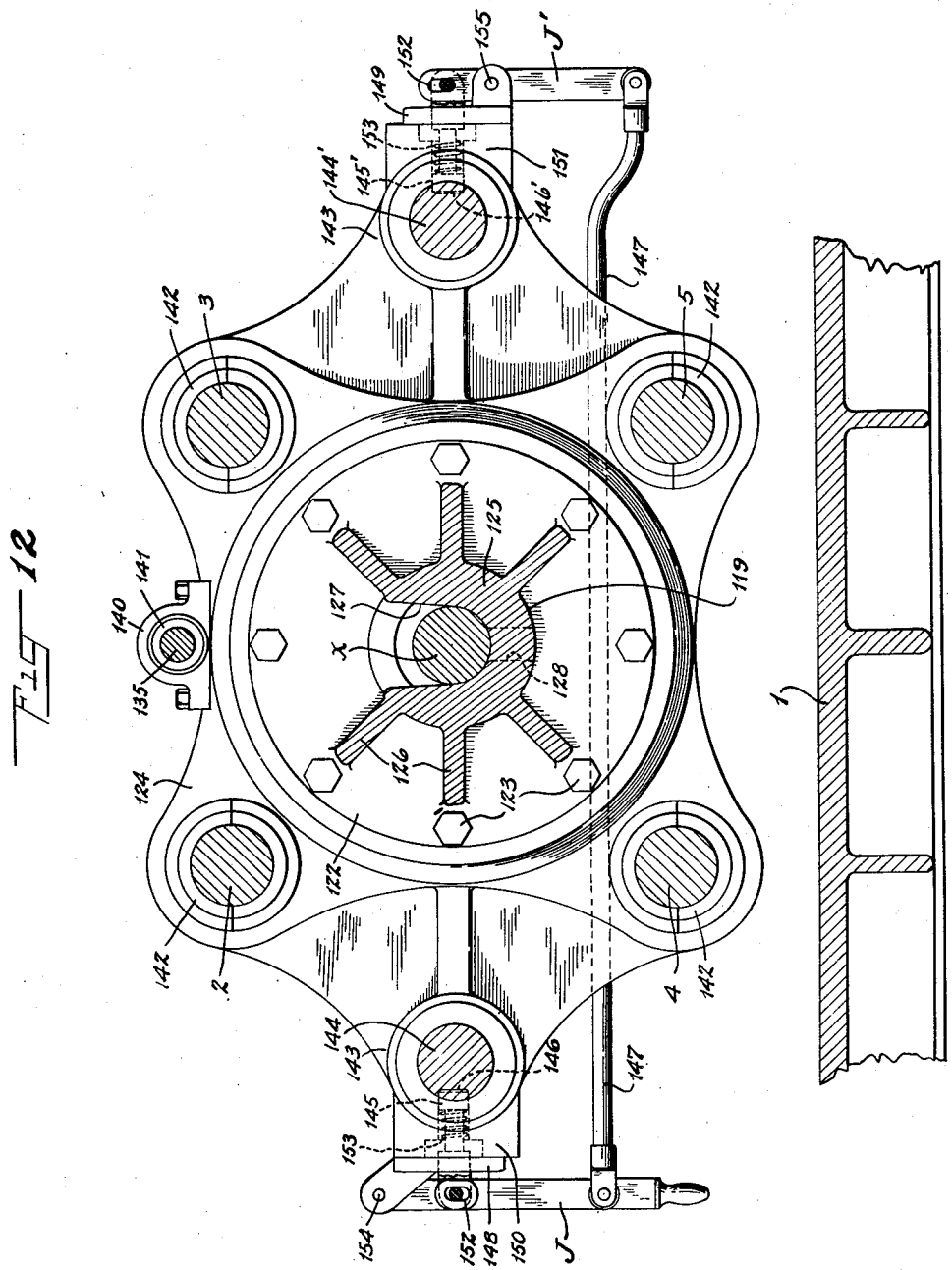

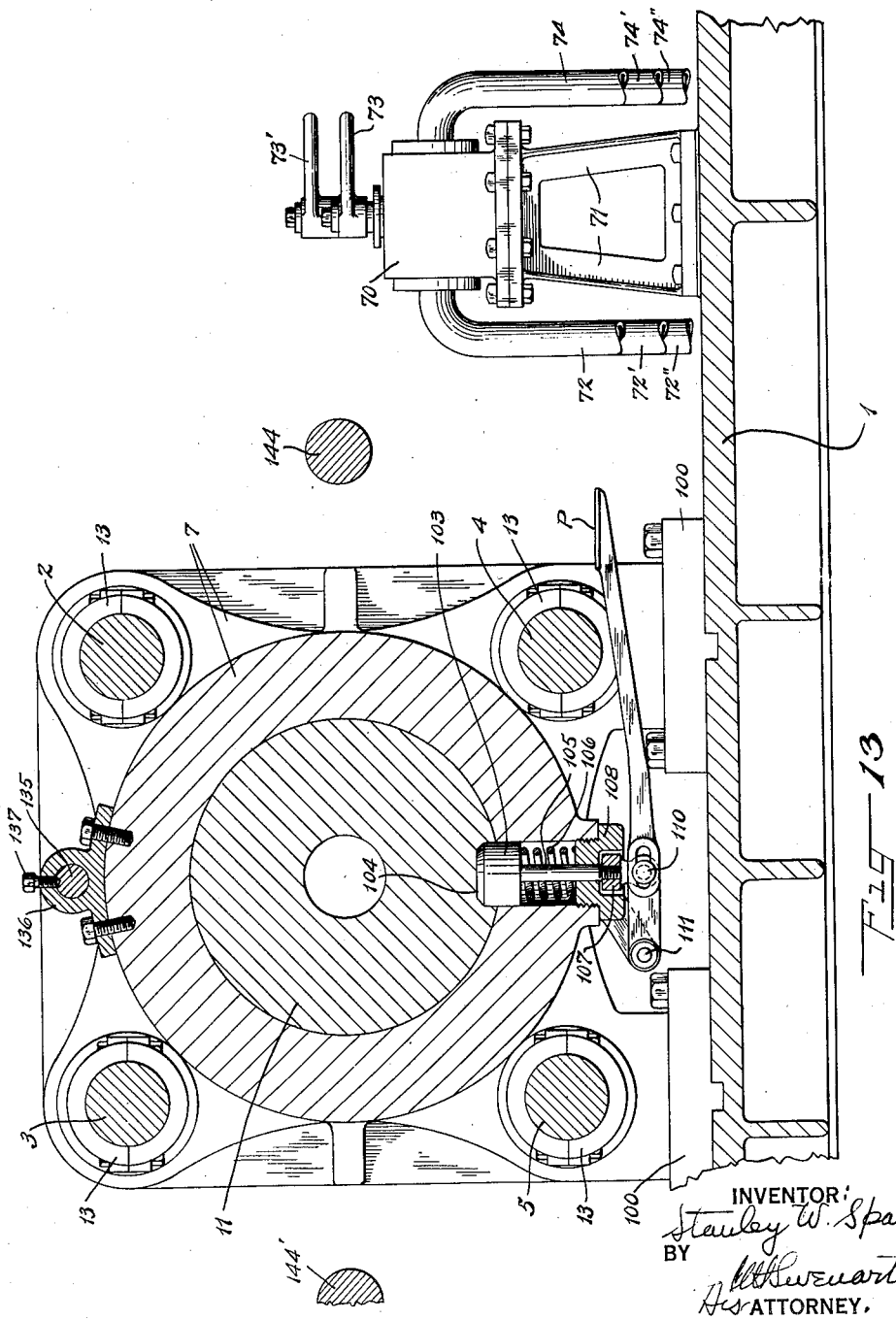

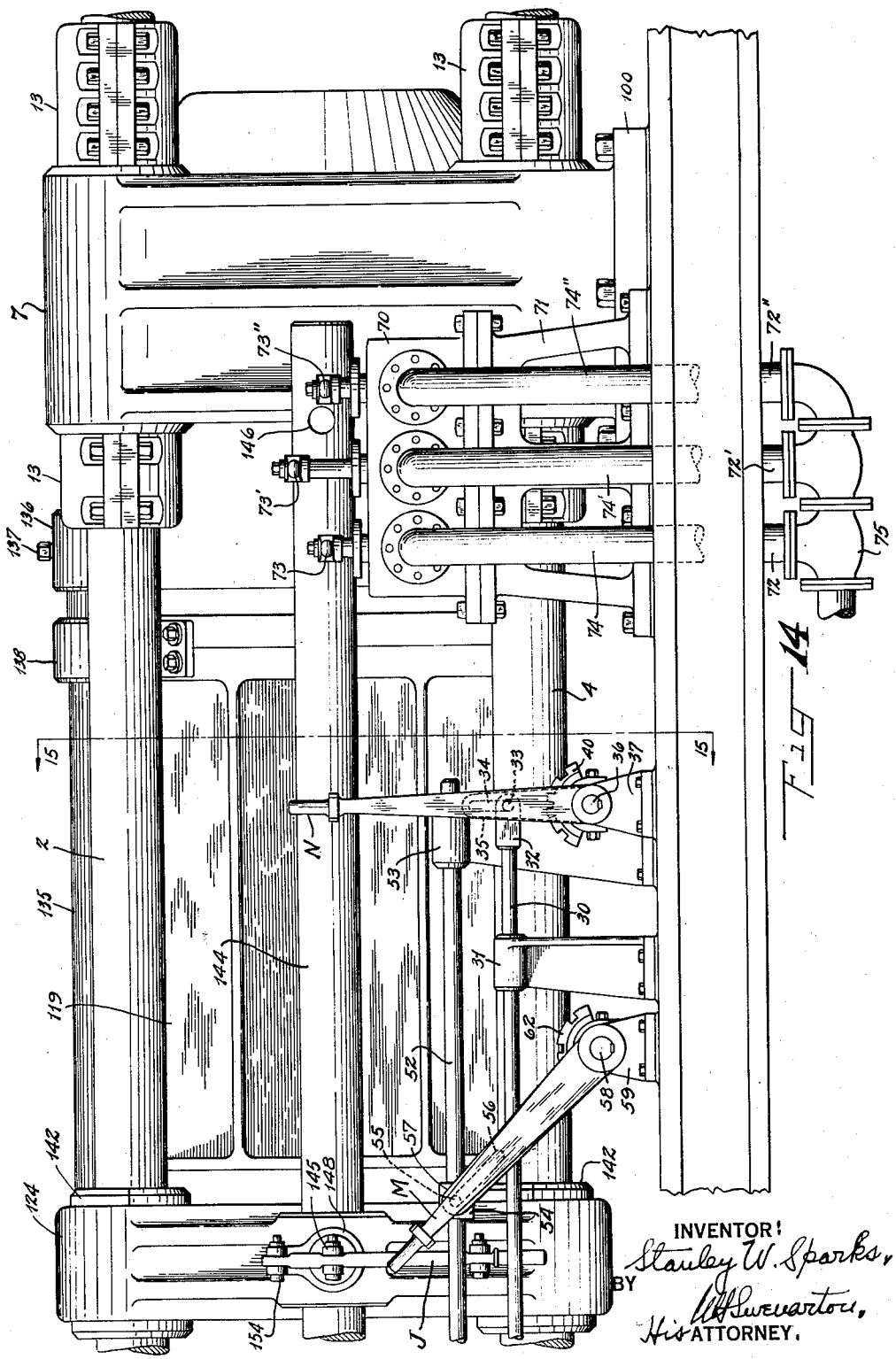

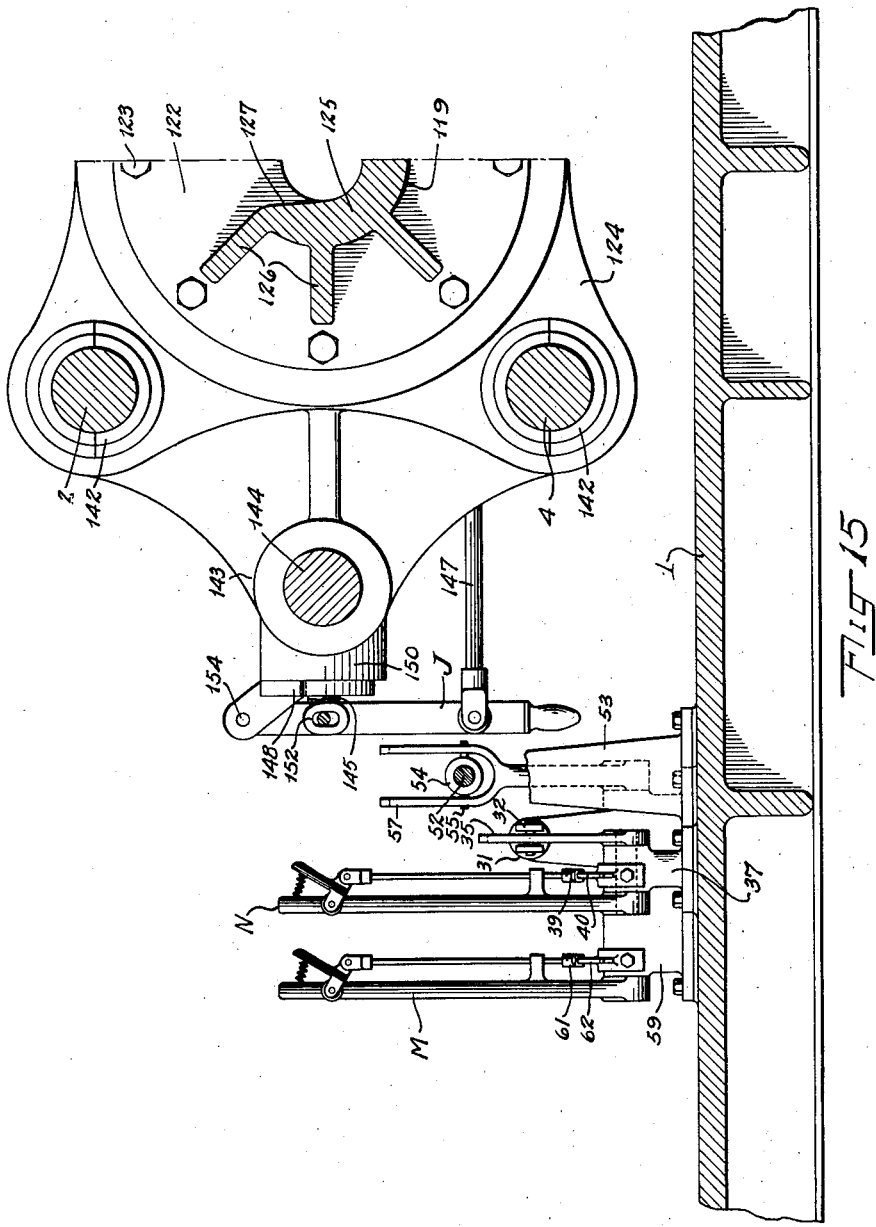

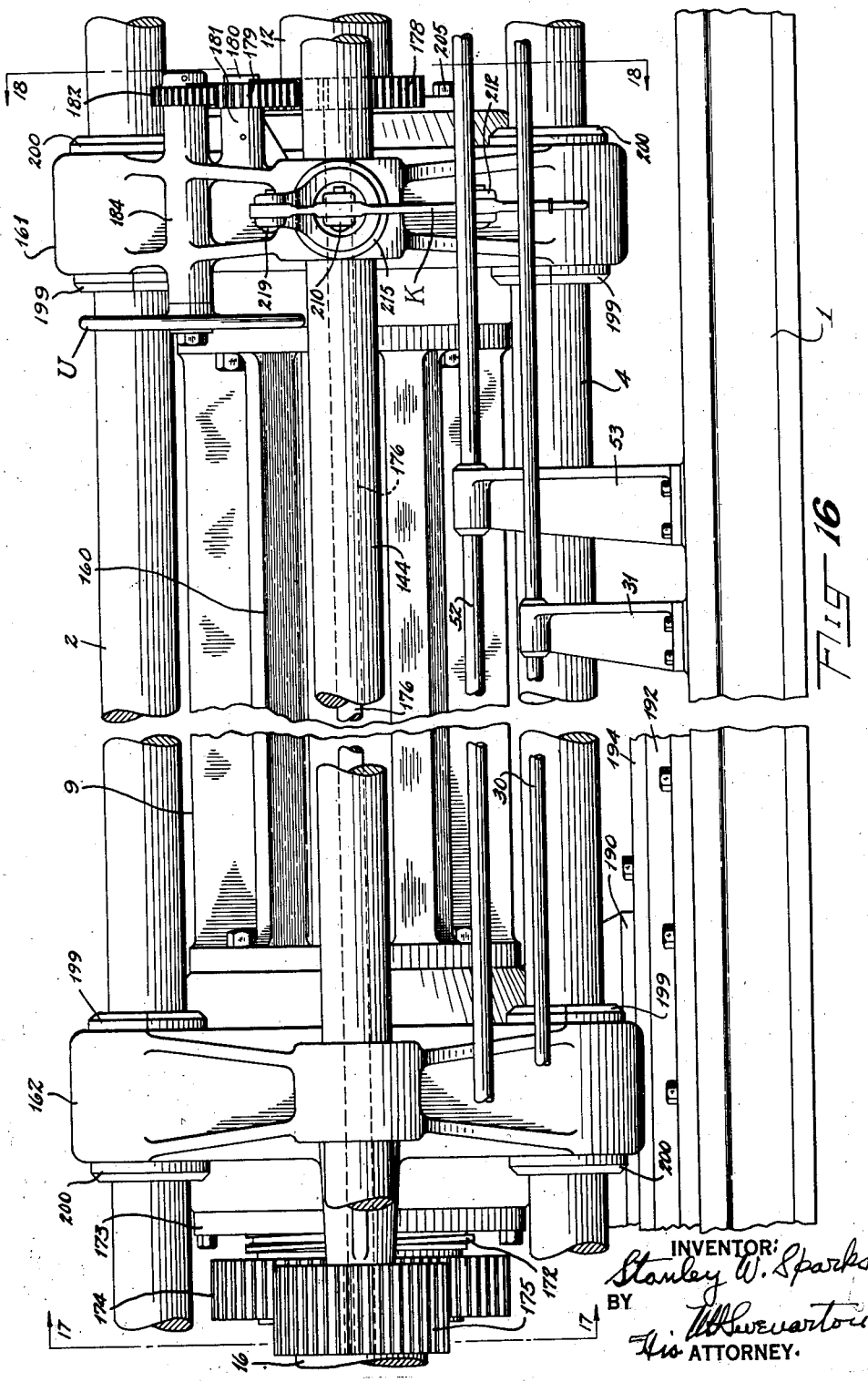

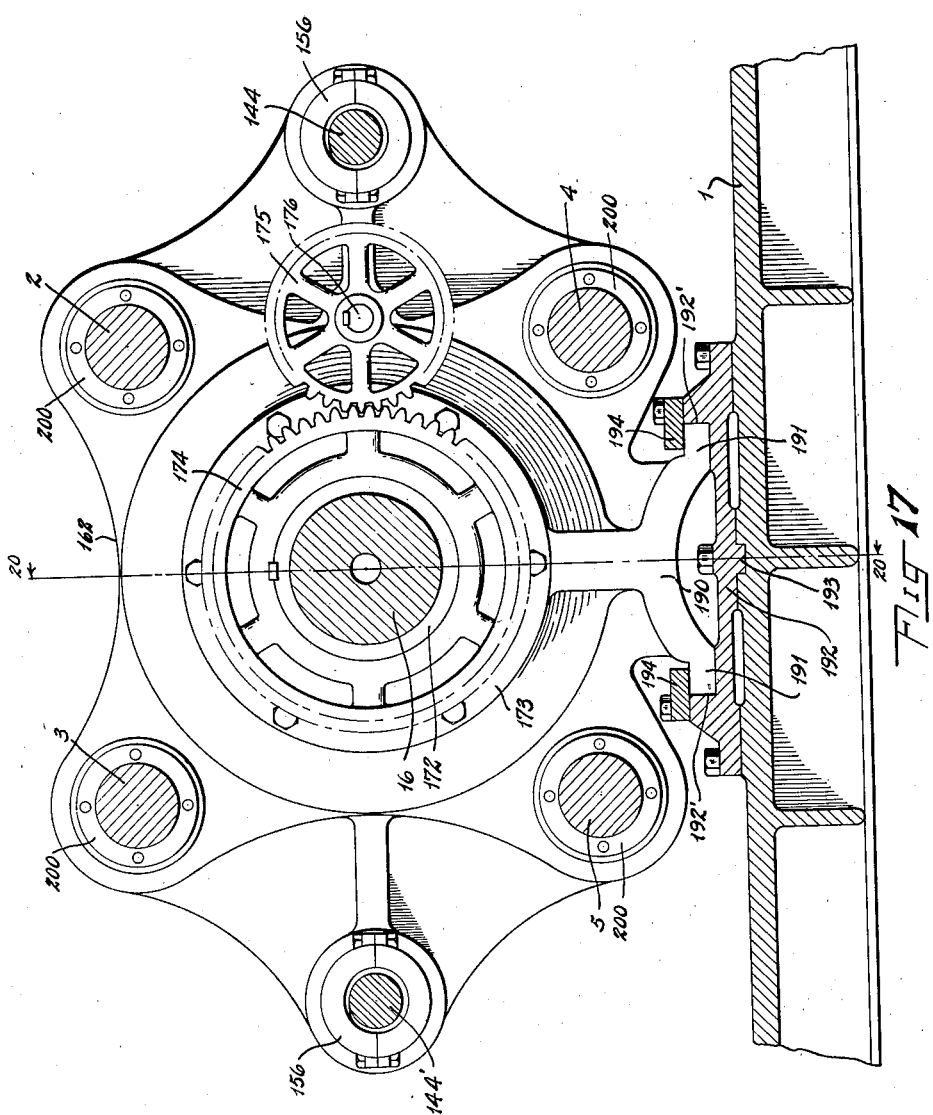

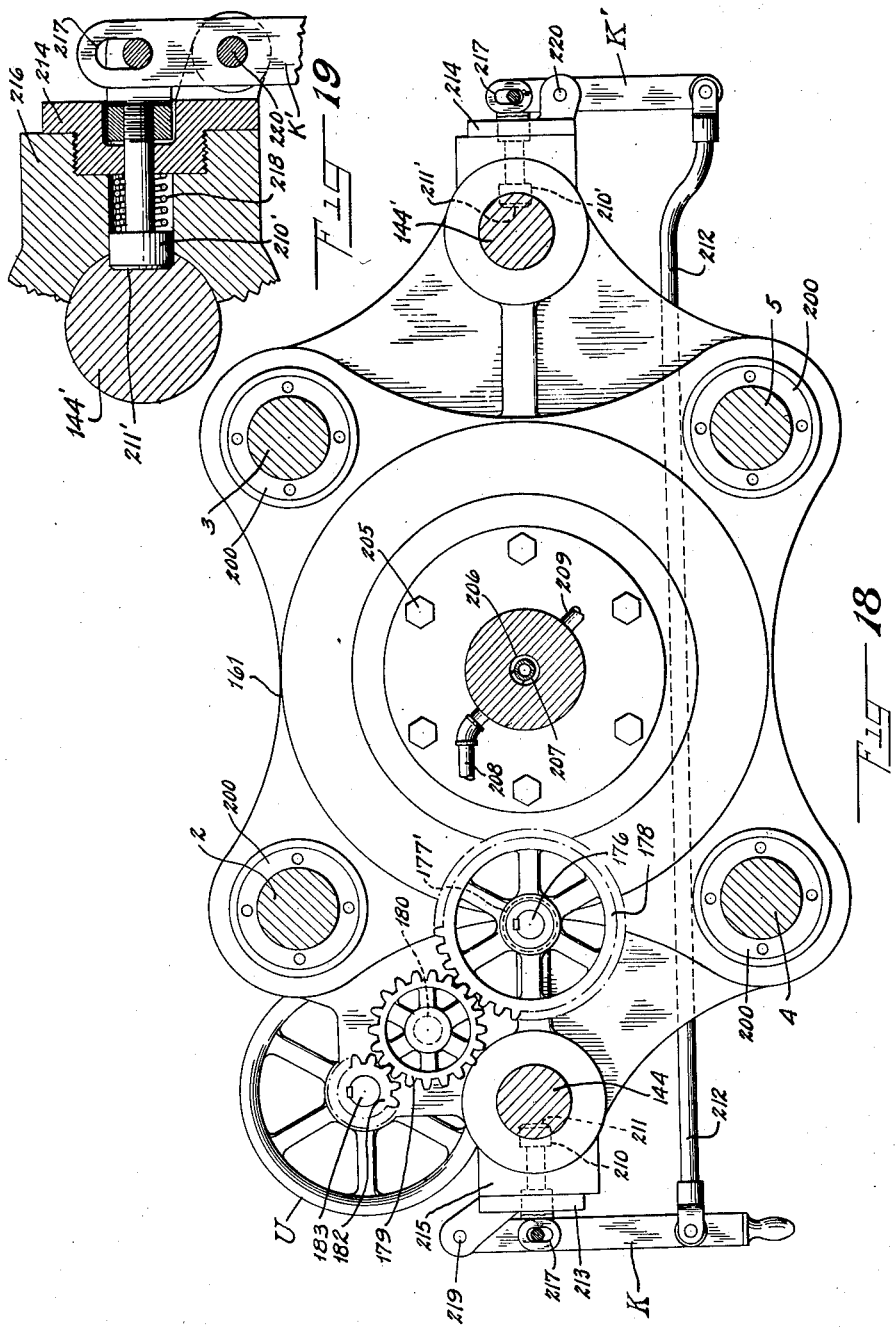

Aug. 29, 1933.  S. W. SPARKS  1,924,522
METHOD OF AND APPARATUS FOR EXTRUDING TUBULAR METAL SHAPES
Original Filed Oct. 4, 1930  15 Sheets-Sheet 13

INVENTOR:
Stanley W. Sparks,
BY
His ATTORNEY.

Aug. 29, 1933.  S. W. SPARKS  1,924,522
METHOD OF AND APPARATUS FOR EXTRUDING TUBULAR METAL SHAPES
Original Filed Oct. 4, 1930   15 Sheets-Sheet 14
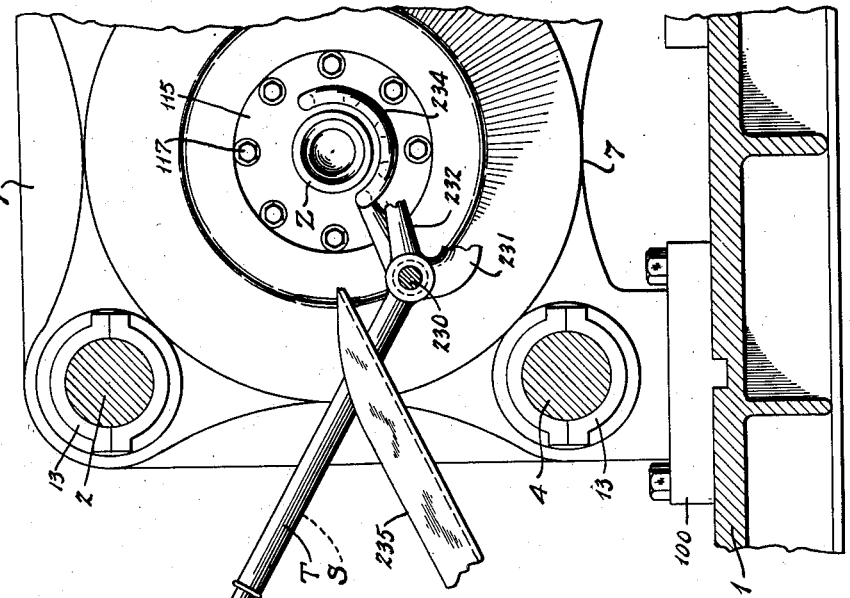
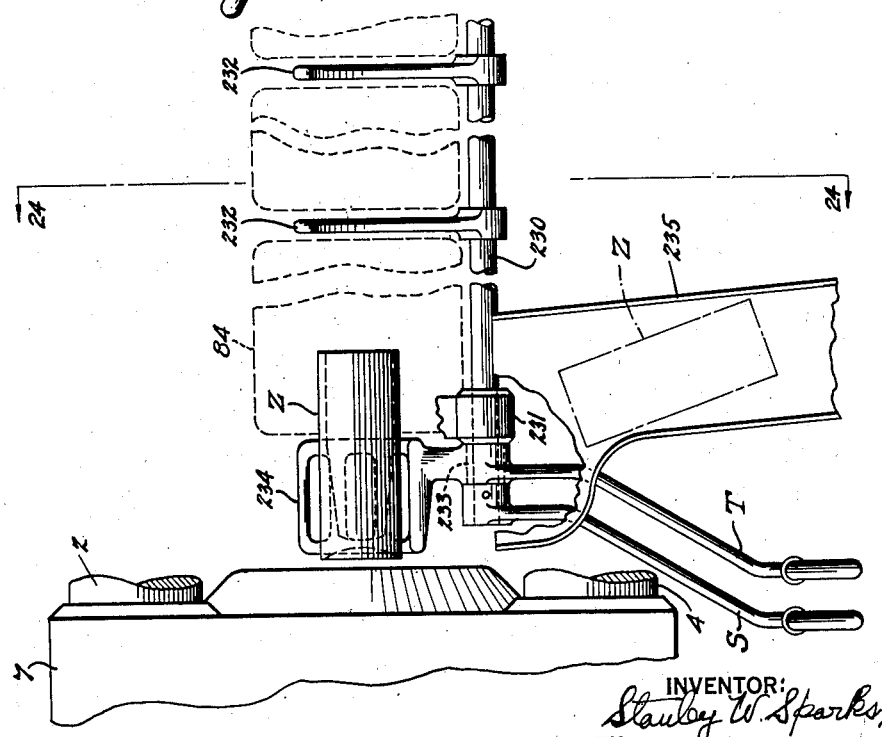
INVENTOR:
Stanley W. Sparks,
BY
His ATTORNEY.

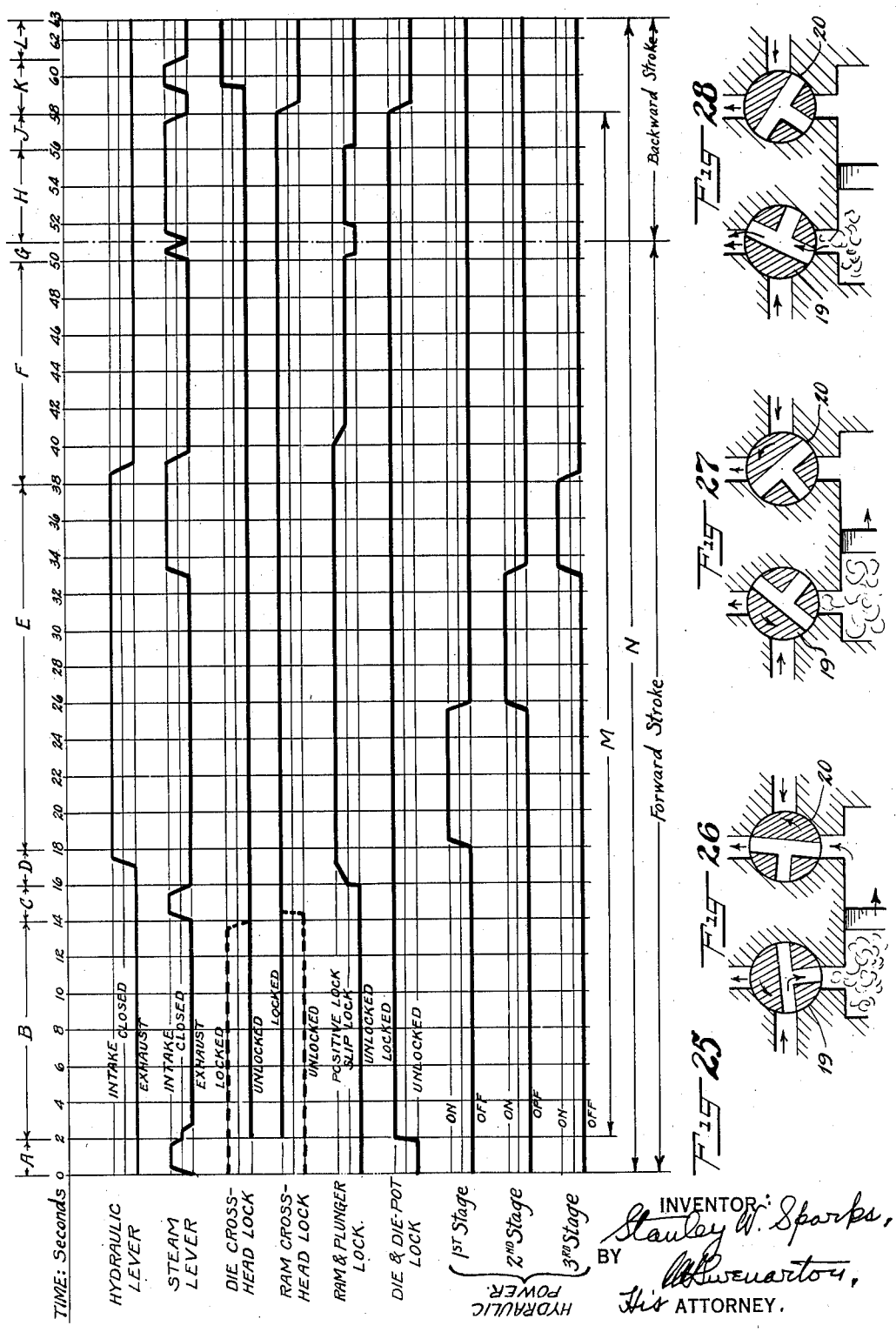

Patented Aug. 29, 1933

1,924,522

UNITED STATES PATENT OFFICE 1,924,522

METHOD OF AND APPARATUS FOR EXTRUDING TUBULAR METAL SHAPES

Stanley W. Sparks, Norwalk, Conn., assignor to Charles H. Bickell, trustee, representing the Metals Research Syndicate, New York, N. Y.

Application October 4, 1930, Serial No. 486,420
Renewed July 15, 1932

15 Claims. (Cl. 207—3)

This invention relates to the high speed, cheap production by extrusion of seamless pipe or tubing which is accurately concentric, of smooth outside and inside finish and of homogeneous wall texture, the same being capable of being formed of steel, wrought iron or of various refractory steel alloys and the provision of a self-contained, power operated apparatus adapted to rapidly produce standard or special lengths and sizes of pipe or tubing from heated blanks, either a billet or an ingot, without necessitating preforming, rolling or otherwise preparing such blank.

In the production of such tubing, rapidity of production, whereby but one heat of the billet or blank employed is required, is essential in order that the blank can be retained in a proper plastic condition throughout the operation and while the progressively increased pressures which are employed are being applied in accordance with the hereinafter described flow sheet diagram. The many movements of the interconnected parts of the apparatus are accurately timed, completely synchronized and in full control of a small group of operators each stationed at a different control station and in the production of a 6″ pipe of 30 ft. length, the complete cycle of the extrusion operation, including the time required for the recovery of the finished pipe, ordinarily requires but about 1 min. and 7 secs.

Among the advantages of this process, in addition to those above specified, are that it lends itself to the employment of a relatively inexpensive base material in contrast to the expensive electric open-hearth ingot employed in the preparation of blanks required in other well known processes of making seamless pipe and also that owing to the confinement of the blank employed in the closed die the same is effectively protected against undue cooling and access of air throughout the operation with the consequence that the oxidation thereof and the formation of scale on the surface of the heated metal both before and during the subsequent extrusion operation, is largely inhibited or retarded so that when the high extrusion pressures are applied to the heated metal, quickly and without retardation, the metal flows thru the dies along the definite flow lines thereof. Furthermore, owing to the fact that the pressures are maintained within definite limits, the metal is not at any time expanded or subjected to pressures beyond its elastic limits at the lower temperatures which prevail during a considerable part of the actual extrusion, with the consequence that there are no serious torsional or expansion strains on the metal as it flows thru the straight-forming-section of the dies and no fissures or cracks can exist in the metal structure of the extruded pipe. Moreover, since the extruded metal quickly loses its plasticity and sets into its proper shape as it reaches the water cooled section of the forming die and travels outwardly over the arbor, no supplemental straightening operation is required.

As a result of all these fundamental differences between the principles governing even one of the most modern methods of manufacturing commercial seamless tubing and my invention, it is possible, thru the employment of my invention, to effect a very substantial saving in the cost of material used, in the first cost for equipment and labor cost to operate a compact self-contained, tube extrusion machine, such as hereinafter set forth, as compared with the cost of the equipment and operating cost of a large tube mill and, lastly, there is a very substantial economy in floor space and the power required to operate my extrusion machine due to the concentration of the operations into a single heating and a single extrusion operation and the fact that the major portion of the power used directly effects the flow of the metal into the finished shape.

Fig. 1 is a diagrammatic side elevation of the left half of an automatic pipe extruding machine embodying my invention, with the parts in retracted position; and Fig. 2 is a diagrammatic side elevation of the right half of the same machine, showing the pipe supporting means, arbor, arbor-retracting means, and arbor-rotating means.

Fig. 3 is a diagrammatic plan of the construction shown in Fig. 1.

Fig. 4 is a side elevation of the billet employed in said machine.

Fig. 5 is a side elevation of a finished pipe produced by the machine; and

Fig. 6 is a side elevation of the nubbin or portion remaining in the die after the pipe has been severed and removed.

Fig. 7 is a partial vertical longitudinal section through the center of the machine with certain of the parts omitted for the sake of clearness, the parts being shown in the position assumed at the end of the hydraulic extrusion stroke; and Fig. 8 is a view similar to Fig. 7 but with the parts shown in the position assumed at the end of the extreme forward stroke whereby the nubbin is expelled; and Fig. 9 is a view also similar to Fig. 7 but with the parts shown in a position ready for feeding in a heated billet.

Fig. 10 is a view similar to Fig. 9 but the die is shown withdrawn from the die pot for cooling, cleaning or replacement of parts.

Fig. 11 is an enlarged vertical longitudinal section of the machine taken through the die, die-pot, charging magazine, and die cross-head.

Fig. 12 is a section on the line 12—12 of Fig. 11.

Fig. 13 is a section on the line 13—13 of Fig. 11.

Fig. 14 is a side elevation of the parts shown in Fig. 11 also the control levers and valves for the hydraulic control.

Fig. 15 is a fragmentary section on the line 15—15 of Fig. 14.

Fig. 16 is a side elevation of the hydraulic ram-supporting-and guiding cross-head.

Fig. 17 is a section on the line 17—17 of Fig. 16.

Fig. 18 is a section on the line 18—18 of Fig. 16.

Fig. 19 is an enlarged fragmentary, vertical cross section through the locking mechanism which secures the cross-head to the traverse rod at periodic intervals.

Figure 20:
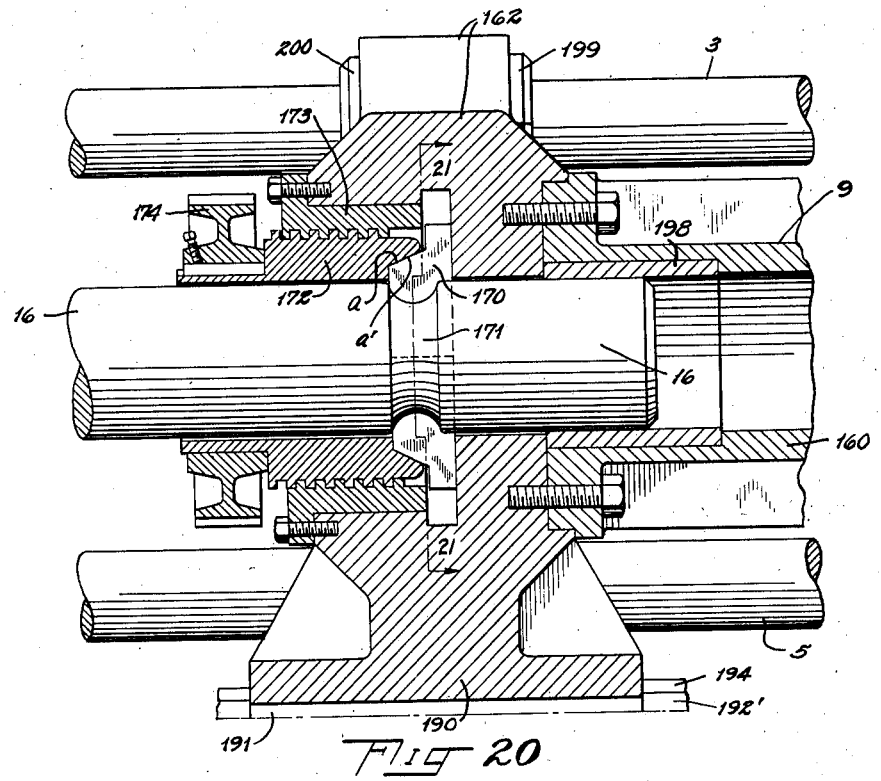

Fig. 20 is a section on the line 20—20 of Fig. 17 showing the mechanism for locking the ram cross-head to the hydraulic plunger.

Figures 21, 22:
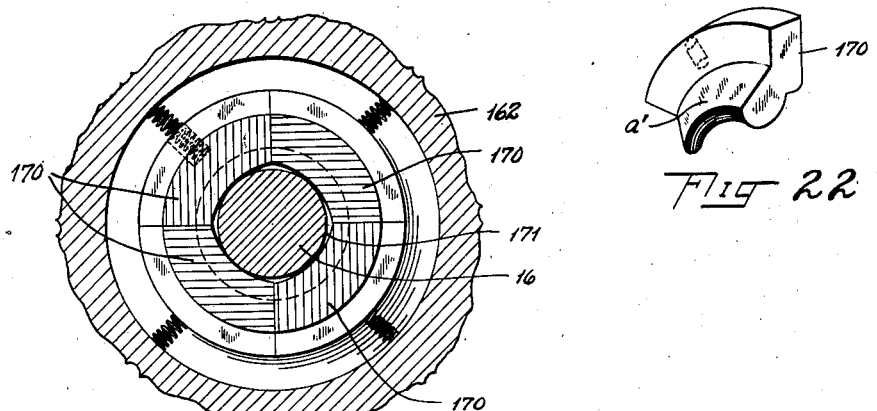

Fig. 21 is a section on the line 21—21 of Fig. 20.

Fig. 22 is a perspective view of one of the locking segments shown in Fig. 21.

Fig. 23 is a fragmentary plan view of a cradle and associated mechanism for disposing of the nubbin after its expulsion from the die.

Fig. 24 is a partial front elevation as viewed on the line 24—24 of Fig. 23.

Fig. 25 is a diagram showing the relation of various operations and their sequential manipulation.

Figs. 26, 27 and 28 are diagrams of the pair of rotary steam valves which are linked together to be operated from a single hand lever, illustrating the impulse, the closed, expanding, and the exhaust positions, respectively, of the forward stroke of the piston.

Referring to the drawings, and more particularly to Figs. 1 to 10 wherein the general arrangement and construction of the apparatus is shown, Figs. 1, 2 and 3 show, somewhat diagrammatically, a self-contained, power driven mechanism, mounted on a series of connected base plates 1 and to which are attached a number of sub-assemblies of the functional mechanism. These parts are all connected in proper relation to each other by four heavy machine steel tie rods 2, 3, 4 and 5 respectively which extend thru and hold firmly in place the hydraulic cylinder 6, the die block 7 and the tail stock 8, all of which are further held in their proper position by being firmly attached to the aforesaid base plates by suitable cap bolts.

The portions of the tie rods between the front end of hydraulic cylinder housing and the open end of the die block 7 serve as guides for the various cross heads hereinafter specifically referred to, which are slidably mounted thereon and reciprocate, as the power of the two steam cylinders 10, 10' and the aforesaid hydraulic cylinder 6 is applied thereto, to move the die 11 in and out of the die block 7 as well as to periodically advance and retract the extrusion ram 12.

The fixed or anchored parts, such as the hydraulic cylinder block 6, the die block 7 and the tail stock 8, are held firmly in their respective positions on the tie-rods by buttress-threaded split nuts 13 which take the power thrust in both directions of the reciprocating ram cross head 9, the charging magazine and die cross head hereinafter described and their attached or interlocking parts. The tail stock 8, being attached to the hydraulic cylinder 6 and die block 7 by the said tie-rods, is held in perfect alignment by the same and the pressure applied thru the arbor 80 to ball-bearing thrust mechanism (not shown) is finally taken by the buttress-threaded nuts 14, 14' which are screwed tightly on both sides against the tail stock 8.

All of the above fixed or anchored pressure members are fitted in perfect central alignment on the bed plate 1 by machined tongues on each member fitted into longitudinal machined slots or grooves, the same being securely bolted thereto.

The hydraulic power unit 6 (see Figs. 1 and 3) is mounted on the base plate in axial alignment with and parallel to a longitudinal center line thru the base plate and the other functional units attached thereto. The two steam traverse cylinders 10, 10' are fitted to the bed plate and mounted one on each side of and parallel to as well as in axial alignment with the hydraulic unit, the cylinders being held firmly in their respective positions by being attached to cast iron cradle pedestals 17 which are attached to the base plate 1. The longitudinal center lines thru these steam cylinders are the same height from the base as the hydraulic cylinder. The hydraulic plunger (not shown) and plunger head either attached thereto or integral therewith are of standard construction for operating at high hydraulic pressures and are preferably of steel. The hydraulic cylinder 6, which also is preferably steel, is closed at the high pressure end and held firmly in place at its ends by heavy cast steel housings (not shown) into which the cylinder is fitted, the same being held securely together by nuts (not shown) similar to nut 14, 14' on the tail stock 8 that is screwed onto the threaded portions of the tie rods.

The hydraulic valve 18 is in communication with the cylinder 6 and located adjacent the end thereof. The valve is controlled at the main control station thru a series of levers and connecting rods as hereinafter more fully described. The extension end 16 of the hydraulic plunger is slidably attached to the cross head 9 and adapted to be periodically locked thereto by the operator at the main control station.

The two steam cylinders 10, 10' shown in Figs. 1 and 3 are identical and are connected with the usual steam-chests (not shown) into which are fitted rotary valves 19, 19' on the rear end for controlling the forward stroke of the steam piston and with valve 20, 20' on the forward end for controlling the backward stroke. The valves 19, 19', 20 and 20' are actuated from a manual control lever mounted on the base place near the main control station. The operating connections between the valves and the control lever N comprise a lever 23 that is secured to the end of the valve stem 21 of the valve 19 and is connected by means of a rod 24 to a lever 25 which is rigidly attached to a pivot shaft 26 that is in turn supported upon the base plate by brackets 27. To the end of the valve stem 22 of valve 20 is secured a lever 28 (similar to lever 23) which is connected to the common lever 25 by a link rod 29. A similar lever-and-link motion to that just described is mounted upon the other end of the shaft 26 on the other side of the machine so that any rotation of said latter shaft simultaneously rotates each of the valves 19, 19', 20 and 20' in the proper direction to produce the desired movement of the piston. A connecting rod 30, operatively attached to the lever 25, passes forward along the machine to the main control station, being slidably supported at suitable points by pedestal brackets 31. The forked end 32 of the rod 30 carries a pin 33 which is in operative relation with a slot 34 in a lever 35 which is keyed to a stub shaft 36 mounted upon the base plate by means of bracket 37. The steam control hand lever N is keyed to the other end of stub shaft 36 and is provided with a latch mechanism 39 which cooperates with a notched segment 40 carried by the bracket 37. The notches are so spaced and of such a number as to correspond to the desired system of operation.

The setting of the valves 19 and 20 (also 19' and 20') in relation to each other is such that when one is full open to intake of steam the other is full open to exhaust, but there is also provided a lead of one over the other so that the part of the cylinder last used may be exhausted without the other valve allowing any impulse into the opposite side of such cylinder. Three successive positions of the valves 19 and 20 are shown in Figs. 26, 27, 28 wherein the forward stroke of the steam piston is indicated. The steam pressure line is indicated in Figs. 1 and 3 by the numeral 41 and the exhaust line by the numeral 42.

The hydraulic stroke control valve 18 is manually operated from the main control station by means of the hand lever M and its operable connection thereto is as follows: the valve stem 51 has keyed upon its outer end a lever 50 to the upper end of which is attached a rod 52 slidably supported in brackets 53 extending upward from the base plate. A collar 54 is secured on the forward end of the rod 52 by a pin 55 which extends beyond the circumference of the collar and engages a pair of slots 56 in the tines of a forked lever 57. This lever is keyed to one end of a stub shaft 58 carried in bracket 59 on the base plate. The other end of the stub shaft 58 has keyed thereon the hand lever or throttle M which is provided with the usual latch mechanism 61 and cooperating notched segment 62 attached to the bracket 59. The hydraulic stroke valve 18 is a rotary valve of the usual type and, as it is rocked or oscillated by means of the lever M, the hydraulic chamber is either opened to the pressure line 75, closed to hold the pressure or opened to exhaust.

There is also provided at the main control station, which is located near the die block 7, a hydraulic power control box 70 mounted upon the base plate by brackets 71. The power control box 70 consists of three rotary valves which are in communication by means of intake pipes 72, 72', 72'' either with hydraulic pressure accumulators or to three stage pumps capable of delivering periodically 2000 pounds, 2500 pounds and 3000 pounds pressure respectively. The operator, by manipulation of the hand levers 73, 73', 73'' on each of the three valves, admits the desired hydraulic pressure to either of the control box outlet pipes 74, 74', 74'', all of which communicate with a common pipe 75 leading to the hydraulic stroke valve 18. Thus it will be seen that in the operation of these valves the hand lever M is first set to the open intake position and then the operator successively opens valves 73, 73', 73'' so as to admit successively increasing pressure to the hydraulic chamber to advance the plunger 16 by periodic progressive strokes.

The part of the machine shown in Fig. 2 consisting of arbor, tail stock, arbor carriage, etc. will not be described in detail as it is fully disclosed in my pending application, Serial No. 362,255, filed May 11, 1929, for Method of and apparatus for making extruded metal shapes, of which case this application is a continuation in part.

The arbor or mandrel 80 (see Figs. 2 and 11) and forming plug 81 are shown in a position ready to receive the extruded metal of the blank X as it is forced over same. The follower 83 holds the arbor 80 in a central position in the mouth of the forming bushing hereinafter described before and while the metal in the billet X is being forced thru the die and around the arbor and said metal in turn forces the follower 83 out of engagement with its split friction collar 82 which is loosely attached to arbor 80 and held in place by shoulders on the arbor. In Fig. 7 the metal is shown passing thru the dies and out over the arbor in the form of a tube Y, which is held in perfect alignment and is supported top and bottom by guides, the top guides being in the form of shoes 87 supported from the tie rods 2, 3 and held resiliently in position by springs 88. The bottom guide rollers 85 are resiliently supported by springs 86 upon a table 84 formed as part of the base plate.

The arbor 80 passes thru the tail stock 8 and is in cooperative engagement therein with a locking mechanism R whereby the thrust of the extrusion operation is transmitted from the arbor to the tail stock. This locking mechanism is similar to one which will hereinafter be described in connection with locking the hydraulic plunger to the ram cross head.

The back end of the arbor 80, which is enlarged, is rotatably mounted in a sliding carriage 90 on which is mounted the arbor rotating means, consisting of a motor 91 whose shaft is coupled to a short shaft 92 mounted in the carriage 90 the end of which carries a pinion 93 in mesh with a gear 94 secured upon the arbor.

After the extrusion operation has ceased, the arbor must be withdrawn from the tube Y previous to the tube being cut off from the nubbin. To accomplish this the carriage 90 is arranged to slide horizontally on the base and for this purpose a nut 95 is formed on its under side. A traverse screw 96 engages the nut 95 and extends to the rear of the machine. A gear 97 keyed to the end of the screw 96 meshes with another gear 98 mounted on the shaft of a motor 99. Thus, when it is desired to withdraw the arbor from the tube, the locking mechanism R is unlocked, releasing the arbor from the tail stock, and the motor 99 is energized thereby causing the carriage 90 and the attached arbor to move rearwardly and out of the tube.

The die-block or die pot 7 (see more particularly Figs. 11, 12, 13, 14, 15) is held in its proper position on the tie rods by heavy split nuts 13 and the side flanges 100 of the base sections which are bolted to the base plate are held in alignment on the base plate 1 by tongues which are fitted into longitudinal grooves machined in the base plate. The large diameter bore in the straight section of the die-block is of a size to have a free sliding fit over the straight turned section of the die 11. The forward section of such bore has a taper slightly sharper than the tapered section of the die 11 in order to form a perfectly tight closure thereof when the die is forced to the bottom of the bore of the die block and locked therein. The extreme front end of the die block is bored to receive the nose or forward end of the die. The die block is made of special cast die steel and designed to withstand extremely high internal pressures and tension strains while being subjected to the high operating temperatures imparted to it from the heat of the billet X. In order to assist in the dissipation of heat, there is provided in the tapered portion of the die pot a groove 101 the same being in communication with atmosphere thru two breather holes 102. The groove and breather holes also serve the purpose of clearing the die pot of scale or other foreign matter which might interfere with the seating of the die in its proper position.

In order to positively lock the die 11 in the die-pot during the extrusion operation, there is provided a locking pin 103 mounted in the lower back portion of the die-pot. A locking hole 104 is drilled in the lower part of the die 11 in a position to register with the pin 103 when the die is in its most advanced position. The pin 103 has a reduced end portion or stem 105 around which a spring 106 is placed to force the pin 103 upwards into the locking position. A pivot bracket 107 is attached to the stem 105 and carries a pivot pin 110 which operates in a slot in a foot lever P. The lever P is pivoted at 111 on extensions of a spring retaining bracket 108 screwed into the lower part of the hole which contains the pin 103 and spring 106. Thus it will be seen that when it is desired to retract the die from the die pot, it is only necessary to depress the outer end of foot lever P and the pin 103 will be withdrawn from the hole 104 in the die and leave the die free to be moved backwardly.

The die 11 is of the solid type and formed of special Vanadium die steel. The nose of the die is smaller in diameter than the main portion and is connected thereto by a sharp taper conforming substantially with the taper in the die pot. This taper is positioned at approximately the point of greatest radial strain during extrusion and serves to properly distribute the forces. It also facilitates an easy "break" between the die and die-pot when it becomes necessary to separate the two. The nose of the die 11 is counter-bored to receive an interchangeable forming bushing 115 which is flanged as at 116 and firmly secured to the die by cap screws 117, the bushing 115, being counter-bored to accommodate the heads of the screws. It is within this bushing that the nose 81 of the arbor 80 projects and the greatest wear of the extrusion operation takes place.

The center bore of the die 11 and also of the bushing 115 is substantially of the same diameter as the external diameter of the tube which is to be formed. The back end of the die is flanged as at 118 and has firmly secured to it the similarly flanged end 120 of the charging magazine 119 the two being held together by the cap bolts 121. At the opposite end of the charging magazine 119 is another flange 122 to which is attached by means of cap screws 123 a sliding cross head 124 adapted to be supported and slide upon the four tie rods 2, 3, 4, 5. Replaceable split bushings 142 are provided in the cross head to facilitate its easy sliding upon the tie rods.

The charging magazine 119 is designed for the easy, quick charging and self-aligning of the billet X preparatory to its mechanical insertion into the die for the extrusion operation. As constructed, the central portion 125 of the magazine is cylindrical in shape and provided with a plurality of radial ribs 126, connecting the cylindrical portion 125 with the two flanges 120, 122 and forming a strong but comparatively light unit. The cylindrical part 125 is provided with a U shaped cavity 127 arranged in line with the central bore in the die 11 and slightly longer than the billet which is to be used. The upper two ribs 126 with the cavity 127 form the charging chamber for the billet, the two ribs acting as guides for properly aligning same. The bottom of the cavity 127 is provided with a series of holes 128 for preventing the accumulation of scale or other foreign matter in the charging chamber. In Fig. 11 the billet X is shown just after being charged into the magazine 119 and in position to be moved forward into extrusion position by the ram 12.

Means for supporting the die 11 and magazine 119 other than the cross head 124 are necessary and, as embodied, comprises a support rod 135 one end of which is fixed in a bracket 136 by set screw 137, the bracket 136 being carried on the upper back end of the die-pot 7. The rod 135 is centrally placed and parallel to the axis of the die and to the tie rods. The opposite extension of the support rod 137 is finally supported by the two upper tie rods 2 and 3 thru the medium of a bracket 140 and bushing 141 secured to the upper central portion of the sliding cross head 124. The die and forward part of the magazine are partially carried and held in alignment on the rod 135 by means of a bracket 138 with bushing 139 which is securely bolted to the upper periphery of the two flanges 120 and 118 of the magazine and die respectively. It will thus be seen that as the cross head, magazine and die unit are withdrawn from the die-pot the bracket 138 slides along the rod 135 and progressively supports same, and, in conjunction with the cross head connection with the tie rods, holds it in perfect alignment.

It is desirable at stated intervals to withdraw the die from the die-pot for purposes of cooling, cleaning, or replacing of worn parts and it is also desirable that this action be quick and, particularly on the back or withdrawal stroke, hammerlike so that the joint between the die and die-pot may be more easily "broken". For this purpose the steam cylinders 10, 10' are utilized, the forward extensions of their piston rods 144, 144' being adapted to pass thru holes in laterally extending wings 143 of the cross head 124, the same being manually locked thereto at the desired intervals by a hand lever J. As illustrated, the locking mechanism consists of two locking pins 145, 145' carried in bosses 150 and 151 on the wings 143 and adapted to project, when in proper register, into holes 146, 146' in the piston rods 144, 144'. The pins 145, 145' which are operatively connected at the slots 152 to their respective levers are operated simultaneously by the hand lever J thru the interconnection of the lever J and the lever J' by the cross rod 147 which passes thru the cross head to the back of the machine.

Brackets 148, 149, secured respectively to bosses 150, 151, serve to retain in place the springs 153 which actuate the pins 145, 145'. The bracket 148 has extensions thereon which carry the pivot 154 of the lever J, while the extensions on the bracket 149 carry the pivot 155 of the lever J'.

Buttress threaded split units 156 are mounted upon the respective piston rods 144, 144', the same being adapted to engage the cross-head 162 and assist the advance of the same during the forward stroke of the pistons thereby relieving the plugs 210, 210' from undue thrusts or stresses.

The location of the lock holes 146, 146' in the piston rods is such that at the beginning of the withdrawal stroke they are slightly in advance of the locking pins 145, 145' so that when the steam impulse is given to the rods they will have a period of momentum-gathering motion previous to the locking pins snapping into place. As the pins drop into place and lock the cross head 124 to the piston rods, this momentum is transmitted in the form of a shock to "break" out the die from the die-pot.

The hydraulic plunger and ram cross head 9 (see Figs. 7 and 16 to 22 inclusive) is a built up or assembled unit that reciprocates on the tie rods which also act as guides and travels between the rear end of the magazine cross head 124 and the front end of the main power unit. Its main structure comprises two heavy cast steel housings 161 and 162 located at the respective ends, to which is bolted a cast steel cylindrical ribbed body member 160 which is centrally bored thru its entire length to receive the forward extension end of the hydraulic plunger 16 that telescopes therein with a free reciprocating movement (see Fig. 7). The construction of the rear cross head housing 162 is somewhat different from the forward one although they both have cylindrical center bosses.

To the rear housing is attached a removable and quickly renewable assembly, comprising the hydraulic plunger locking mechanism which periodically engages and locks the cross head 9 directly to the plunger 16 by engagement of quadrantly-disposed, spring-pressed segments, constituting a split ring 170, with a semi-circular groove 171 machined in and around the periphery of the forward end of said plunger 16. This sectional ring 170 is locked in position, after its periodic engagement, by an outside coarse-pitch, threaded sleeve 172 that engages in corresponding threads machined on the inside of a heavily flanged bushing 173 which is fitted into a hole bored in the rear end housing 162 and is rigidly held in its proper position by cap screws that are fitted into tapped holes in rear face of the housing 162. The inside section of the threaded sleeve 172 is counterbored on a taper $a$ the angle of which is the same as the angle on the outside tapered portion $a'$ of the split ring 170 so that when the threaded sleeve 172 is moved forward by rotating the sleeve, the tapered bore of same engages the tapered section $a'$ of the ring and holds it tightly and fixedly in the groove 171 of the hydraulic plunger 16 and therefore when the forward high pressure thrust is applied thereto the line of pressure force moves from the plunger to the ring 170, thence to the straight machined face in the bottom of the hole in the housing 162 and thence thru the assembled parts of the sliding cross head 9 direct to the attached extrusion ram 12. The outside section of the sleeve 172 is machined to a reduced diameter and to this is fitted and keyed a straight-face spur gear 174 which is rotated by a pinion gear 175 keyed to a longitudinal shaft 176 that is carried in bearings 177' formed in the housings 162, 161 respectively. On the forward end of the drive shaft 176 there is keyed a spur gear 178 which leads thru a gear train comprising an idler gear 179 carried by a stub shaft 180 mounted in a boss 181 on the housing 161 and a pinion 182, which meshes with gear 179. The pinion 182 is keyed on one end of a shaft 183 the other end of which has keyed thereon a hand wheel U, the shaft 183 being journaled in a long bearing 184 formed on the housing 161. By rotating the hand wheel U in either direction the operator can freely and rapidly move the plunger locking sleeve 172 into a locked or unlocked position within the locking chamber in housing 162.

The bottom section of the rear housing 162 is flared forward and rearward from a vertical center line and has longitudinal and cross ribs and flanged wings 192, the flanges being machined on three sides to form a cross-head slide 190 similar to the well known cross head slide of a reciprocating engine. This cross-head slide 190 is slidably mounted and attached to a guide 192 mounted on the bed plate and its bottom has a machined guide 193 that fits closely into machined grooves or slots in the base plate, being held fixedly in place by cap bolts. On the top section of the guide member there are attached, one on each side, machine-steel strips 194 running the full length thereof which prevent the cross head 9 from lifting upwards while reciprocating. These strips are also held in position by cap bolts and are so fitted as to allow a free sliding movement of the cross head 9 therein, but otherwise they prevent any buckling movement in aforesaid four tie rods and at all portions of the cross head stroke act as a guide while the high, traverse and thrust pressures are being applied thereto. A positive but resilient stop to determine the rearmost position of the cross head 9 is provided and consists of a block of rubber or other resilient material held in place in the guideway 192 by a bracket strip 196.

The cross head 9 comprises the aforesaid cylindrical body 160 which consists of a heavy cast steel member, cylindrical in shape, with six heavy longitudinal ribs radially disposed around its periphery and on each end are identical flanges which are machined and drilled to fit counter-bored holes in the forward and rear housings 161, 162 being attached thereto by heavy cap bolts. The center bore of the cylinder is machined to allow a free telescoping sliding movement of the hydraulic plunger 16 therein, the rear section of this bored hole being counter-bored to receive a renewable machined bronze bushing 198 which has a close sliding fit around the hydraulic plunger 16 that keeps the plunger from traveling in other than a perfect central plane. The greatest pressure force is applied to the body of the cross head when in its forward extrusion movement, but ample provision is made in the strength of the bolts, which secure the flanges, to withstand any drawback pressures that are applied to the cross head when breaking out and withdrawing the die 11 from the die block 7. The forward housing 161 of the cross head is attached to the cylindrical body section in the same manner as the rear housing 162 and is similar in shape and design, except as to the width of its center body section and its lack of the slide 190. The quadrantly-disposed wing sections of the cross head into which holes are bored to receive the tie rods, are fitted with renewable split bronze bushings 199 that are held in plate by threaded flange plates 200 which are attached to the machined bosses on the face of the housings 161, 162 by flat-head screws (see Figs. 16, 17, 18).

The extrusion ram 12 is attached to the front housing 161 of the cross head 9 by heavy cap bolts 205 fitted into tapped holes in the front face of the housing (see Fig. 18). The ram is constructed for cooling by water, (although it can be made solid if desired) having an axial drilled hole 206 which ends near the forward or working end of the ram. A pipe 207, considerably smaller in diameter than the hole 206, is centered within the hole and has its forward end open and in communication with same. At the back end of the ram or adjacent its union with the housing 161 there are two pipes inserted, one being an intake pipe 208 for the cooling fluid and attached to the pipe 207 while the other is an outlet pipe 209 which is only in communication with the hole 206. Thus the cooling medium passes in through pipe 208, courses along pipe 207 to the hot end of the ram then out of the pipe and back along the outside of same and within the hole 206, thence leaving the ram by the pipe 209.

The hydraulic ram 12 is actuated at different stages of its stroke by either the hydraulic cylinder 6 or the steam cylinders 10, 10' or by both the hydraulic and steam cylinders working together. Due to the steam cylinders also being utilized to withdraw the die from the die-pot means for detaching or unlocking the ram cross head 9 from the steam traverse rods 144, 144' are provided, the same comprising a manually operable locking system similar in all respects to that on the die cross head 124. As embodied the system comprises locking pins 210, 210' mounted in bosses 215, 216 respectively on the housing 161. (See Figs. 18, 19.) The pins are adapted to engage in drilled holes 211, 211' in the piston rods 144, 144', being forced into same, when in register, by springs 218. The pins are retractable manually by hand lever K and lever K' which are connected together by a reach rod 212. The levers K, K' are pivoted at 219, 220 on projections carried by brackets 213, 214 which are screwed or otherwise secured to bosses 215, 216. The brackets also serve to retain the springs 218 in place. Pins 210, 210' are operably connected to the levers K, K' by a pin and slot connection 217.

After the extrusion operation has been completed the finished tube Y is cut off from the small part still remaining in the die or the nubbin Z by a saw V and removed from the machine. (See Figs. 7, 8, 23, 24.) This is accomplished by first retracting the upper guide shoes 87 and then manipulating a hand lever S secured on the end of a rock shaft 230 which is carried in bosses 231 on the pipe guide table 84. The rock shaft 230 has secured thereto, at spaced intervals, a plurality of ejector arms 232 which upon being actuated by the hand lever S raise the tube free from the guide rollers 85 to a position where it can be removed from the machine to a rack, conveyer, or other device for storing or handling.

The nubbin Z is then ejected from the die by a further forward movement of the ram 12 as will be hereinafter described in greater detail in the description of operations. There is provided a mechanism for receiving and removing the nubbin from the machine after it has been ejected from the die which comprises an ejecter lever T pivotally mounted upon a hub 233 extending outwardly from the boss 231 lying nearest the die block 7. The end of the lever T, opposite the handle, is in the form of a cradle 234 which is positioned just below the mouth of the die block and between the die block and the guide roller table 84. A chute 235 is provided so that as the nubbin drops into the cradle 234 and is raised out of the machine it can be rolled or slid to a container or conveyor for further operations.

The chart or diagram illustrated in Fig. 25 shows graphically the sequence of operation of the various cross head locks, hydraulic power levers, and steam lever and the positional relation of each of these levers to any other at any particular instant of time. The heavy black line illustrates, for example, whether a valve is open to intake, closed, or open to exhaust by its position in relation to one of three horizontal lines indicated as intake, closed, or exhaust. The time intervals are designated by vertical lines and are labeled 0, 2, 4, 6, 8 etc. to indicate elapsed seconds. The grouped time intervals shown at the top of the chart and labeled A, B, C, D, etc. indicate what operation is taking place during that interval of time. The legend for the letters is as follows:

A. The die is moved into the die pot by steam and is automatically locked therein.

B. Scale and dirt is cleaned from charging magazine and the billet is dropped into same.

C. Billet is moved by steam from the magazine into the die and into contact with the nose of the arbor.

D. Resetting of levers to change from steam to hydraulic power.

E. Extrusion operation; by hydraulic power applied in stages of pressure and finally adding in the available steam power.

F. Arbor is retracted from finished tube and tube is cut off and removed from the machine.

G. The nubbin is expelled from the die by steam power and removed from machine.

H. Hydraulic plunger and ram are retracted, the plunger reaching its rearmost position at the 56th second where it unlocks itself from the ram while the ram continues rearward.

J. Ram and ram cross head continue to retract and reach their rearmost position.

K. Die "broken" out of die pot and withdrawn from same by steam power.

L. Interval for cleaning and cooling die.

In the continuous operation of this machine it may not be necessary to withdraw the die from the die pot after every extrusion stroke in which case a complete cycle takes place in a shorter interval of time. This interval on the chart runs from the line 2 to the line 58 and is indicated by the letter M at the bottom of the chart. The letter N designates a complete cycle of operation when the die withdrawing movement is included.

When operating on either carbon steel ingots or billets, it is recommended that the metal blank be heated to a temperature of approximately 2390 degrees F. After the blank has been heated to the proper temperature, it is then removed from the furnace by travelling crane tongs and preferably is quickly introduced into the front aperture of a revolving wire brush cleaning machine, (not shown in drawing) situated conveniently to the extrusion machine wherein it is thoroughly cleaned from scale before it is introduced into the magazine to be processed. During the cleaning operation, the heated blank will lose some of its heat, maintaining, however, a temperature of not less than about 2350 degrees F. at the time it is projected into the lower half of the split die.

In my co-pending application aforesaid No. 362,255 I have included a plasticity metal flow sheet showing the velocity of flow of steel at varying temperatures and while varying extrusion pressures are being applied thereto the same having been computed for the production of tubing known as 6 in. extra heavy pipe of A. S. M. E. standard specification and while in the instant application lower pressures may be employed than in the construction and method disclosed in said former application owing to the fact that the bore of the extrusion chamber is substantially of uniform cross section throughout the major portion of its length and therefore it is not necessary to accomplish the reduction in cross section of the blank introduced thereinto, nevertheless it is desirable to apply at intervals stepped up ram pressures at different stages of the extrusion operation which do not exceed the elastic limits of the metal and yet are sufficient to effect the substantially uniform extrusion of the tube or shape through the extrusion orifice. When producing a 20 ft. length of 6 in. extra heavy pipe, above referred to, from a billet, say approximately 425 lbs. weight, it is preferable to employ an extrusion ram pressure in the first hydraulic stage of about 15,000 to 20,000 lbs. pressure and in the second stage about 20,000 to 25,000 lbs. pressure and in third stage about 25,000 to 32,500 lbs. pressure. The motor to which the arbor is connected is rotated in a clockwise direction during the extrusion operation at a speed sufficient to drive the arbor at about 300 R. P. M. and during the withdrawal of the arbor from the extruded shape, the rotation of the motor is reversed to an anticlockwise direction whereby the rotation at the forming end of the arbor will have a reaming and straightening effect on the extruded tube or other shape during the withdrawal of the arbor. The traverse velocity of the arbor during the reciprocating movement thereof, is preferably at about the rate of 125 lineal ft. per minute. When operating upon refractory alloys, the initial temperature to which the blank is heated is such that the plasticity thereof is well below both the burning and the melting point thereof, but not less than approximately 2250 degrees F. and sufficient to render the metal generally of a plastic condition similar to that obtained when heating mild steel, say 0.3% of carbon to a temperature of 2250 degrees F. and 2350 degrees F. However, contrary to what would ordinarily be expected, nickel steel and other refractory steel alloys admirably lend themselves to extrusion by this method, notwithstanding the fact that it is difficult if not almost impossible to obtain satisfactory results if rolling operations are performed thereon.

The pipe or tubing obtainable when employing my invention is of remarkable uniformity of wall thickness even when lengths of 30 to 40 ft. or more are extruded and which feature is of the utmost importance in connection with the drilling of oil wells.

Various changes within the scope of the present claims may be made without departing from the spirit of my invention as herein set forth.

Having thus described my invention, what I claim and desire to obtain by United States Letters Patent is:

1. A unitary apparatus for the extrusion of tubular shapes, comprising an extrusion ram element, means for applying predetermined graduated high pressures thereto, a die having a terminal orifice at one end to receive the ram and an extrusion orifice at the other end, said die having associated therewith a blank-receiving magazine, the latter having a lateral charging aperture for the introduction of a blank into such magazine, said magazine having aligned orifices at its respective ends adapted to register with the aforesaid orifices in such die, means for limiting the forward movement of such ram during the extrusion operation, a retractible, rotatable arbor adapted to be projected into the extrusion orifice of the die during the extrusion operation, means for rotating said arbor, means for advancing and retracting the latter into and away from said extrusion orifice and means for causing said extrusion ram to advance beyond the forward limits to which the same has been projected during the extrusion operation in order to eject the nubbin from the die.

2. A unitary apparatus for the extrusion of tubular shapes, comprising an extrusion ram element, means for applying high pressures thereto, a co-operating die member into which said ram is adapted to be projected, a charging magazine disposed in front of said die, said magazine having a lateral aperture for the reception of a blank to be extruded, means in said magazine for supporting a blank in an operative position therein, a die pot adapted to receive said die and support the same during the extrusion operation, means for optionally withdrawing said die from said die pot to admit of the cooling thereof, a retractible arbor adapted to be projected into said die during the extrusion operation, a follower element carried by said arbor and adapted to be projected into the space between the periphery of said arbor adjacent the inner end thereof and the periphery of the exit orifice of said die, a portion of said follower element being of the same cross section as that of the tubular shape to be extruded and another portion of enlarged cross section immediately beyond such portion whereby the extent to which such follower can be projected into the extruded orifice is positively limited, means for advancing or retracting said extrusion ram element and separate means for advancing and withdrawing said arbor.

3. In a unitary apparatus for the extrusion of tubular shapes, the sub-combination comprising a die member, a die pot adapted to receive the same, an extrusion ram adapted to co-operate with and to be projected into said die, and a charging magazine associated with the intake end of said die member, said magazine having a lateral charging orifice whereby a blank adapted to be extruded may be introduced into said magazine without requiring an excessive movement of the extrusion ram.

4. In a unitary apparatus for the extrusion of tubular shapes, the sub-combination comprising a die member adapted to receive a blank to be extruded and a charging magazine associated with the intake of such die member, said charging magazine having a lateral charging aperture of a length at least equal to the length of a blank to be extruded and a grid member projecting across such magazine adapted to receive a blank introduced through such aperture and to maintain the same preliminary to its introduction into the die at a level corresponding to the bottom of the bore of the die whereby such blank can be quickly projected into said die while in alignment with the bore thereof.

5. A unitary apparatus for the extrusion of tubular shapes, comprising an extrusion ram element, means for successively applying high pressures thereto, a die having an exit extrusion orifice into which such ram is adapted to be projected, the bore of said die being of substantially uniform cross section throughout the major portion of the length thereof, and a charging chamber associated with the inlet end of said die, said charging chamber having a central chamber of hemi-cylindrical configuration at the bottom thereof and open at the top thereof, said top opening communicating with a longitudinally extending hopper adapted to receive blanks intended to be extruded.

6. The method of extruding hollow tubular shapes of ferrous metal, which comprises providing a supporting platform for a ferrous metal blank to be extruded in proximity to the entrance to the bore of a die in which such blank is to be extruded, laterally delivering a metal blank while heated to an extrusion temperature onto said platform in such a manner that the longitudinal axis of said blank is in substantial alignment with the axis of the bore of a die, introducing into the extrusion orifice of the bore of said die in arbor whose maximum diameter throughout the portion thereof which enters the die, corresponds substantially to the internal diameter of the hollow shape to be extruded from said die, and causing a moving extruding ram to engage the rear end of said blank and forcibly project the same into the bore of said die and then, while said blank is confined within said die and while rotating said arbor, subjecting the blank to high pressures exerted thereon by said ram and sufficient to extrude the same between the periphery of said rotating arbor and the internal periphery of the extrusion orifice of the bore of said die.

7. The method of extruding hollow tubular shapes of ferrous metal, which comprises providing a supporting platform for a ferrous metal blank to be extruded in proximity to the entrance to the bore of a die in which such blank is to be extruded, laterally delivering a metal blank while heated to an extrusion temperature onto said platform in such a manner that the longitudinal axis of said blank is in substantial alignment with the axis of the bore of a die, introducing into the extrusion orifice of the bore of said die, an arbor whose maximum diameter throughout the portion thereof which enters the die corresponds substantially to the internal diameter of the hollow shape to be extruded from said die, and causing a moving extruding ram to engage the rear end of said blank and forcibly project the same into the bore of said die and while said blank is confined within said die, then, while rotating said arbor, subjecting the blank to high pressures exerted thereon by said ram sufficient to extrude the same between the periphery of said rotating arbor and the internal periphery of the extrusion orifice of the bore of said die, then severing the extruded shape from the nubbin remaining in the die and causing the extrusion ram to eject the nubbin through the said extrusion orifice.

8. The method of extruding hollow tubular shapes of ferrous metal, which comprises providing a supporting platform for a ferrous metal blank to be extruded in proximity to the entrance to the bore of a die in which such blank is to be extruded, laterally delivering a metal blank while heated to an extrusion temperature onto said platform in such a manner that the longitudinal axis of said blank is in substantial alignment with the axis of the bore of a die, introducing into the extrusion orifice of the bore of said die an arbor whose maximum diameter throughout the portion thereof which enters the die corresponds substantially to the internal diameter of the hollow shape to be extruded from said die, and causing a moving extruding ram to engage the rear end of said blank and forcibly project the same into the bore of said die and while said blank is confined within said die and while rotating said arbor subjecting the blank to successively stepped up high pressures exerted thereon by said ram sufficient to extrude the same between the periphery of said rotating arbor and the internal periphery of the extrusion orifice of the bore of said die.

9. In the method of extruding metal shapes, the steps which comprise providing a charging magazine adjacent the entrance to the bore of a die while the latter is confined in a die-pot, laterally delivering a metal blank, while heated to an extrusion temperature and which blank is of a maximum transverse dimension not exceeding the diameter of said entrance orifice, onto a supporting platform in said charging magazine, forcibly projecting said blank from said platform into the said bore of the die, causing an extrusion ram while subjected to high pressures to effect the extrusion of the blank from said die, severing the extruded shape from the unextruded nubbin remaining in the die, removing the nubbin from said die and then longitudinally withdrawing said die from the die-pot, cooling the same and re-introducing it into the die-pot preparatory to another cycle of extrusion operations.

10. In the method of extruding metal shapes, the steps which consist subjecting a metal blank while heated to an extrusion temperature and while confined in a die having a bore of substantially uniform cylindrical configuration throughout the major portion of its length to progressively stepped up ramming pressures sufficient to extrude such shape at a predetermined rate of speed from said die, severing the extruded shape from the nubbin remaining in the die and then causing the forward ejection of said nubbin from said die by subjecting the nubbin to a supplemental ramming thrust.

11. In an apparatus for the extrusion of metal shapes, the combination with a die having a cylindrical extrusion chamber therein of substantially uniform cross section throughout, of a charging magazine having a blank receiving chamber of hemi-cylindrical configuration at the bottom, the diameter of which hemi-cylindrical bottom being substantially the same as that of the said extrusion chamber, said magazine having a blank charging aperture positioned above the axis of said blank receiving chamber.

12. A unitary apparatus for the extrusion of tubular shapes, comprising a die having an extrusion orifice at one end thereof, a retractible arbor adapted to be projected into the extrusion orifice of said die, the maximum diameter of that portion of said arbor which is adapted to be projected into the die being substantially less than the inside diameter of said extrusion orifice, means for successfully advancing and retracting the said arbor into and away from said extrusion orifice, pressure means for causing the extrusion of metal from a blank confined within said die through the annulus between said arbor and the inner periphery of said die including means to engage the nubbin end of the blank and project the same forwardly along the die following the completion of the extrusion operation.

13. A unitary apparatus for the extrusion of tubular shapes, comprising a die having an extrusion orifice at one end thereof, a retractible arbor adapted to be projected into the extrusion orifice of said die, the maximum diameter of that portion of said arbor which is adapted to be projected into the die being substantially less than the inside diameter of said extrusion orifice, means for effecting relative rotation of said arbor with respect to said die, means for successively advancing and retracting the said arbor into and away from said extrusion orifice, pressure means for causing the extrusion of metal, from a blank confined within said die, through the annulus between said arbor and the inner periphery of said die including means to engage the nubbin end of the blank and project the same forwardly along the die following the completion of the extrusion operation.

14. The method of extruding hollow tubular metal shapes, which comprises introducing a metal blank, while heated to an extrusion temperature, into a die having a substantially cylindrical bore, introducing into the extrusion orifice of the bore of said die an arbor whose maximum diameter, throughout the portion thereof which enters the die, corresponds substantially to the internal diameter of a hollow shape to be extruded from said die and is substantially less than the inside diameter of said die, then, while effecting relative rotation between said die and said arbor, exerting sufficient pressure upon a blank confined within said die to effect the extrusion of the same through the annulus between the periphery of the arbor and the internal periphery of the die and then causing the forward projection through the unobstructed extrusion orifice of the die of the nubbin end of said extruded shape.

15. The method of extruding hollow tubular metal shapes, which comprises introducing a metal blank, while heated to an extrusion temperature, into a die having a substantially cylindrical bore, introducing into the extrusion orifice of the bore of said die an arbor whose maximum diameter, throughout the portion thereof which enters the die, corresponds substantially to the internal diameter of a hollow shape to be extruded from said die and is substantially less than the inside diameter of said die, exerting sufficient pressure upon a blank confined within said die to effect the extrusion of the same through the annulus between the periphery of the arbor and the internal periphery of the die and then causing the forward projection through the unobstructed extrusion orifice of the die of the nubbin end of said extruded shape.

STANLEY W. SPARKS.